United States Patent
Park et al.

(10) Patent No.: US 9,760,981 B2
(45) Date of Patent: Sep. 12, 2017

(54) IMAGE PROCESSING PART, DISPLAY APPARATUS HAVING THE SAME AND METHOD OF PROCESSING AN IMAGE USING THE SAME

(71) Applicant: Samsung Display Co., Ltd., Yongin, Gyeonggi-Do (KR)

(72) Inventors: Mun-San Park, Hwaseong-si (KR); Cheol-Woo Park, Suwon-si (KR); Yun-Ki Baek, Suwon-si (KR); Kyoung-Ju Shin, Hwaseong-si (KR); Tadashi Amino, Cheonan-si (KR)

(73) Assignee: Samsung Display Co., Ltd. (KR)

( * ) Notice: Subject to any disclaimer, the term of this patent is extended or adjusted under 35 U.S.C. 154(b) by 315 days.

(21) Appl. No.: 13/963,906

(22) Filed: Aug. 9, 2013

(65) Prior Publication Data

US 2014/0232711 A1 Aug. 21, 2014

(30) Foreign Application Priority Data

Feb. 18, 2013 (KR) .................. 10-2013-0016832

(51) Int. Cl.
*G06T 5/00* (2006.01)
*G06T 5/20* (2006.01)

(52) U.S. Cl.
CPC .............. *G06T 5/003* (2013.01); *G06T 5/20* (2013.01); *G06T 2207/20192* (2013.01)

(58) Field of Classification Search
None
See application file for complete search history.

(56) References Cited

U.S. PATENT DOCUMENTS

| | | | |
|---|---|---|---|
| 7,956,910 B2 | 6/2011 | Lim et al. | |
| 8,120,817 B2 | 2/2012 | Lee | |
| 2003/0011679 A1* | 1/2003 | Jung | H04N 17/004 348/181 |
| 2007/0116369 A1* | 5/2007 | Zandi | G06F 17/148 382/240 |
| 2007/0286287 A1* | 12/2007 | Kim | H04N 19/51 375/240.16 |
| 2008/0159386 A1* | 7/2008 | Lee | H04N 19/176 375/240.03 |
| 2011/0243434 A1 | 10/2011 | Cao | |
| 2012/0169905 A1 | 7/2012 | Ovsiannikov et al. | |

(Continued)

FOREIGN PATENT DOCUMENTS

| | | |
|---|---|---|
| JP | 2011-133954 | 7/2011 |
| JP | 2011-160168 | 8/2011 |
| JP | 2012-044617 | 3/2012 |

(Continued)

*Primary Examiner* — Seokyun Moon
*Assistant Examiner* — Douglas Wilson
(74) *Attorney, Agent, or Firm* — Innovation Counsel LLP

(57) ABSTRACT

An image processing part includes an edge enhancing part, an artifact detecting part and a compensating part. The edge enhancing part emphasizes an edge portion of an object in input image data. The artifact detecting part detects a corner outlier artifact at an area adjacent to the edge portion of the object. The compensating part compensates the corner outlier artifact. Accordingly, the edge portion of the object may be enhanced and the corner outlier artifact is decreased so that the display quality may be improved.

17 Claims, 5 Drawing Sheets

(56) References Cited

U.S. PATENT DOCUMENTS

2012/0189196 A1    7/2012  Li et al.
2012/0327140 A1*  12/2012  Wu ..................... G09G 3/3611
                                                              345/690

FOREIGN PATENT DOCUMENTS

| KR | 10-2007-0105534 | 10/2007 |
|----|-----------------|---------|
| KR | 10-2008-0046427 | 5/2008 |
| KR | 10-2008-0082451 | 9/2008 |
| KR | 10-2009-0017205 | 2/2009 |

* cited by examiner

IMAGE PROCESSING PART, DISPLAY APPARATUS HAVING THE SAME AND METHOD OF PROCESSING AN IMAGE USING THE SAME

PRIORITY STATEMENT

This application claims priority under 35 U.S.C. §119 to Korean Patent Application No. 10-2013-0016832, filed on Feb. 18, 2013 in the Korean Intellectual Property Office KIPO, the contents of which are herein incorporated by reference in their entireties.

BACKGROUND OF THE INVENTION

1. Field of the Invention

Exemplary embodiments of the present invention relate to an image processing part, a display apparatus having the image processing part and a method of processing an image using the image processing part. More particularly, exemplary embodiments of the present invention relate to an image processing part improving a display quality, a display apparatus having the image processing part and a method of processing an image using the image processing part.

2. Description of the Related Art

Generally, a liquid crystal display ("LCD") apparatus includes a first substrate including a pixel electrode, a second substrate including a common electrode and a liquid crystal layer disposed between the first and second substrate. Alternatively, an LCD apparatus includes a first substrate including a pixel electrode and a common electrode, a second substrate facing the first substrate and a liquid crystal layer disposed between the first and second substrate. An electric field is generated by voltages applied to the pixel electrode and the common electrode. By adjusting an intensity of the electric field, a transmittance of a light passing through the liquid crystal layer may be adjusted so that a desired image may be displayed.

Generally, a display apparatus includes a display panel and a panel driver. The panel driver processes input image data and provides the image data to the display panel. When the panel driver processes input image data, an edge of an object in the input image data may become unclear.

Data corresponding to the edge portions of the object may be emphasized to clarify the edge of the object in an image. However, when the edge portions of the object are over-emphasized, a corner outlier artifact may be generated.

SUMMARY OF THE INVENTION

Exemplary embodiments of the present invention provide an image processing part improving a display quality.

Exemplary embodiments of the present invention also provide a display apparatus having the image processing part.

Exemplary embodiments of the present invention also provide a method of processing an image using the image processing part.

In an exemplary embodiment of an image processing part according to the present invention, the image processing part includes an edge enhancing part, an artifact detecting part and a compensating part. The edge enhancing part emphasizes an edge portion of an object in input image data. The artifact detecting part detects a corner outlier artifact at an area adjacent to the edge portion of the object. The compensating part compensates the corner outlier artifact.

In an exemplary embodiment, the artifact detecting part may detect a pixel having a maximum grayscale difference among pixels in a matrix shape and determine that the pixel having a maximum grayscale difference has the corner outlier artifact when a difference between a grayscale of the pixel having a maximum grayscale difference and grayscales of other pixels in a matrix shape is greater than a low threshold value.

In an exemplary embodiment, the artifact detecting part may determine that the pixel having a maximum grayscale difference has the corner outlier artifact when the difference between the grayscale of the pixel having a maximum grayscale difference and the grayscales of the other pixels is greater than the low threshold value and less than a high threshold value.

In an exemplary embodiment, the artifact detecting part may analyze the input image data to determine the low threshold value and the high threshold value according to the input image data.

In an exemplary embodiment, the compensating part determines a pixel having the corner outlier artifact and a plurality of pixels adjacent to the pixel having the corner outlier artifact in a direction as target pixels to be compensated.

In an exemplary embodiment, the target pixels may be disposed in a vertical direction.

In an exemplary embodiment, the compensating part may apply a compensating matrix having one row and three columns to the target pixels to compensate the corner outlier artifact.

In an exemplary embodiment, the compensating matrix may have values of (1/3, 1/3, 1/3).

In an exemplary embodiment, the compensating matrix may have values of (1/4, 1/2, 1/4).

In an exemplary embodiment, the compensating part may apply a compensating matrix having three rows and three columns to the target pixels to compensate the corner outlier artifact.

In an exemplary embodiment, the compensating matrix may have values of $$\begin{pmatrix} 1/9 & 1/9 & 1/9 \\ 1/9 & 1/9 & 1/9 \\ 1/9 & 1/9 & 1/9 \end{pmatrix}.$$

In an exemplary embodiment, the compensating matrix may have values of $$\begin{pmatrix} 1/16 & 1/16 & 1/16 \\ 1/16 & 1/2 & 1/16 \\ 1/16 & 1/16 & 1/16 \end{pmatrix}.$$

In an exemplary embodiment, the image processing part may further include a low pass filter applying low pass filtering to the input image data to remove noise of the input image data and a high pass filter applying high pass filtering to the input image data to detect the edge portion of the object in the input image data. The edge enhancing part may add a result of the low pass filtering and a result of the high pass filtering to emphasize the edge portion of the object.

In an exemplary embodiment of a display apparatus according to the present invention, the display apparatus includes a display panel, a gate driver, a data driver and a timing controller. The display panel displays an image. The gate driver provides a gate signal to the display panel. The data driver provides a data voltage to the display panel. The timing controller includes an image processing part. The image processing part includes an edge enhancing part, an artifact detecting part and a compensating part. The edge enhancing part emphasizes an edge portion of an object in input image data. The artifact detecting part detects a corner outlier artifact at an area adjacent to the edge portion of the object. The compensating part compensates the corner outlier artifact. The timing controller controls the gate driver and the data driver.

In an exemplary embodiment, the artifact detecting part detects a pixel having a maximum grayscale difference among pixels in a matrix shape, and the artifact detecting part determines that the pixel having a maximum grayscale difference has the corner outlier artifact when a difference between a grayscale of the pixel having a maximum grayscale difference and grayscales of other pixels in a matrix shape is greater than a low threshold value.

In an exemplary embodiment, the artifact detecting part may determine that the pixel having a maximum grayscale difference has the corner outlier artifact when the difference between the grayscale of the pixel having a maximum grayscale difference and the grayscales of the other pixels is greater than the low threshold value and less than a high threshold value.

In an exemplary embodiment, the compensating part may determine a pixel having the corner outlier artifact and a plurality of pixels adjacent to the pixel having the corner outlier artifact in a direction as target pixels to be compensated.

In an exemplary embodiment of a method of processing an image according to the present invention, the method includes emphasizing an edge portion of an object in input image data, detecting a corner outlier artifact at an area adjacent to the edge portion of the object and compensating the corner outlier artifact.

In an exemplary embodiment, the detecting a corner outlier artifact may include detecting a pixel having a maximum grayscale among first to fourth pixels in a matrix shape and determining that the pixel having a maximum grayscale difference has the corner outlier artifact when a difference between a grayscale of the pixel having a maximum grayscale difference and grayscales of other pixels in a matrix shape is greater than a low threshold value.

In an exemplary embodiment, the determining that the pixel having a maximum grayscale difference has the corner outlier artifact may include determining that the difference between the grayscale of the pixel having a maximum grayscale difference and the grayscales of the other pixels is less than a high threshold value.

In an exemplary embodiment, the compensating the corner outlier artifact may include determining a pixel having the corner outlier artifact and a plurality of pixels adjacent to the pixel having the corner outlier artifact in a direction as target pixels to be compensated.

According to the image processing part, the display apparatus having the image processing part and the method of processing the image using the image processing part, an edge portion of an object may be enhanced and a corner outlier artifact may be prevented. Thus, a display quality may be improved.

BRIEF DESCRIPTION OF THE DRAWINGS

The above and other features and advantages of the present invention will become more apparent by describing in detailed exemplary embodiments thereof with reference to the accompanying drawings, in which.

DETAILED DESCRIPTION OF THE INVENTION

Hereinafter, embodiments of the present invention will be explained in detail with reference to the accompanying drawings.

Figure 1:
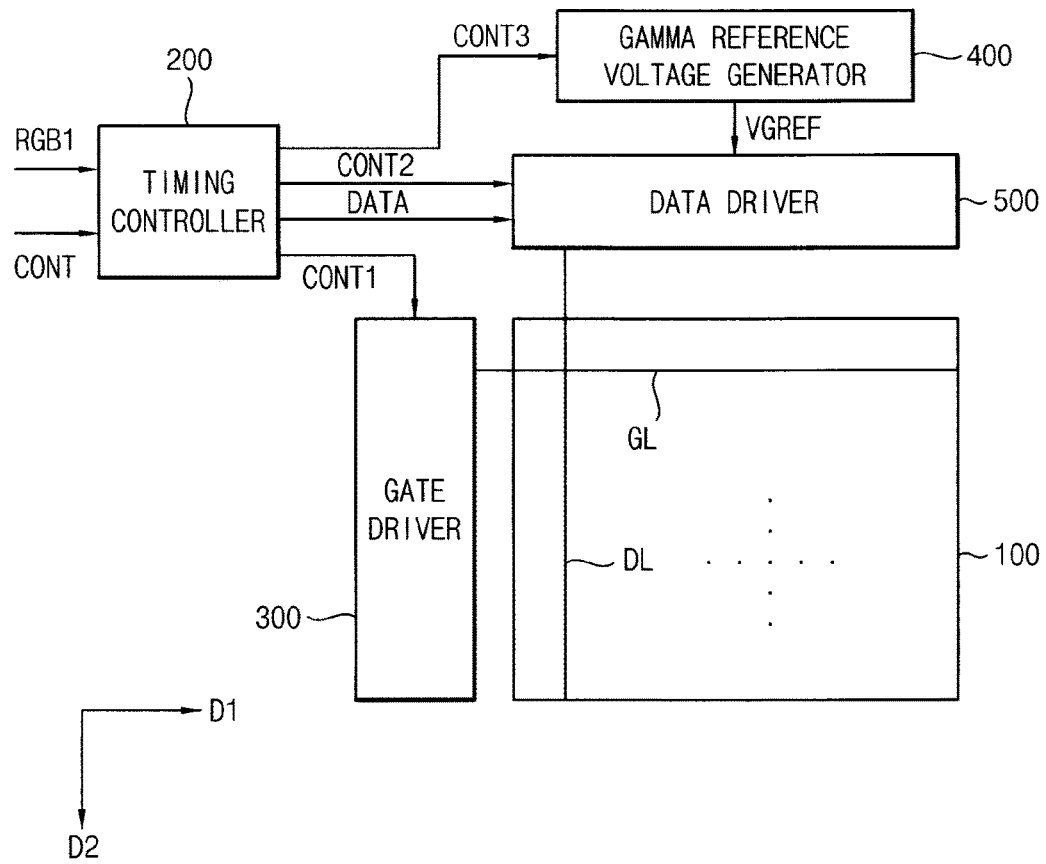
FIG. 1 is a block diagram illustrating a display apparatus according to an exemplary embodiment of the present invention.

FIG. 1 is a block diagram illustrating a display apparatus according to an exemplary embodiment of the present invention.

Referring to FIG. 1, the display apparatus includes a display panel 100 and a panel driver. The panel driver includes a timing controller 200, a gate driver 300, a gamma reference voltage generator 400 and a data driver 500.

The display panel 100 displays an image. The display panel 100 has a display region on which an image is displayed and a peripheral region surrounding the display region.

The display panel 100 includes a plurality of gate lines GL, a plurality of data lines DL and a plurality of unit pixels connected to the gate lines GL and the data lines DL. The gate lines GL extend in a first direction D1 and the data lines DL extend in a second direction D2 crossing the first direction D1.

Each unit pixel includes a switching element (not shown), a liquid crystal capacitor (not shown) and a storage capacitor (not shown). The liquid crystal capacitor and the storage capacitor are electrically connected to the switching element. The unit pixels may be disposed in a matrix form.

The timing controller 200 receives input image data RGB1 and an input control signal CONT from an external apparatus (not shown). The input image data RGB1 may include red image data R, green image data G and blue image data B. The input control signal CONT may include a master clock signal and a data enable signal. The input control signal CONT may further include a vertical synchronizing signal and a horizontal synchronizing signal.

The timing controller 200 generates a first control signal CONT1, a second control signal CONT2, a third control signal CONT3 and a data signal DATA based on the input image data RGB1 and the input control signal CONT.

The timing controller 200 generates the first control signal CONT1 for controlling an operation of the gate driver 300 based on the input control signal CONT, and outputs the first control signal CONT1 to the gate driver 300. The first control signal CONT1 may further include a vertical start signal and a gate clock signal.

The timing controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal.

The timing controller 200 generates the data signal DATA based on the input image data RGB1. The timing controller 200 outputs the data signal DATA to the data driver 500.

The timing controller 200 generates the third control signal CONT3 for controlling an operation of the gamma reference voltage generator 400 based on the input control signal CONT, and outputs the third control signal CONT3 to the gamma reference voltage generator 400.

Figure 2:
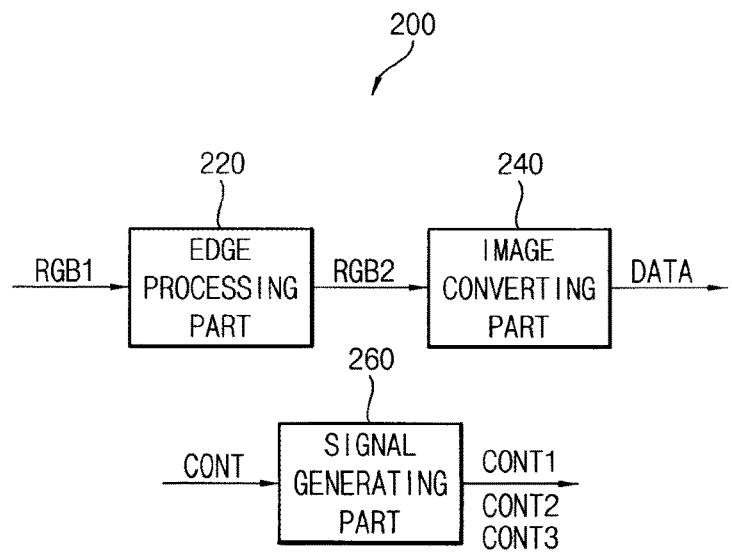
FIG. 2 is a block diagram illustrating a timing controller of FIG. 1.

A structure of the timing controller 200 is explained referring to FIG. 2 in detail.

The gate driver 300 generates gate signals driving the gate lines GL in response to the first control signal CONT1 received from the timing controller 200. The gate driver 300 sequentially outputs the gate signals to the gate lines GL.

The gate driver 300 may be directly mounted on the display panel 100, or may be connected to the display panel 100 as a tape carrier package (TCP) type. Alternatively, the gate driver 300 may be integrated on the peripheral region of the display panel 100.

The gamma reference voltage generator 400 generates a gamma reference voltage VGREF in response to the third control signal CONT3 received from the timing controller 200. The gamma reference voltage generator 400 provides the gamma reference voltage VGREF to the data driver 500. The gamma reference voltage VGREF has a value corresponding to a level of the data signal DATA.

In an exemplary embodiment, the gamma reference voltage generator 400 may be disposed in the timing controller 200 or in the data driver 500.

The data driver 500 receives the second control signal CONT2 and the data signal DATA from the timing controller 200, and receives the gamma reference voltages VGREF from the gamma reference voltage generator 400. The data driver 500 converts the data signal DATA into data voltages having an analog type using the gamma reference voltages VGREF. The data driver 500 outputs the data voltages to the data lines DL.

The data driver 500 may include a shift register (not shown), a latch (not shown), a signal processing part (not shown) and a buffer part (not shown). The shift register outputs a latch pulse to the latch. The latch temporally stores the data signal DATA. The latch outputs the data signal DATA to the signal processing part. The signal processing part generates a data voltage having an analog type based on the data signal having a digital type and the gamma reference voltage VGREF. The signal processing part outputs the data voltage to the buffer part. The buffer part compensates the data voltage to have a uniform level. The buffer part outputs the compensated data voltage to the data line DL.

The data driver 500 may be directly mounted on the display panel 100, or be connected to the display panel 100 in a TCP type. Alternatively, the data driver 500 may be integrated on the peripheral region of the display panel 100.

FIG. 2 is a block diagram illustrating the timing controller 200 of FIG. 1.

Referring to FIGS. 1 and 2, the timing controller 200 includes an edge processing part 220, an image converting part 240 and a signal generating part 260. The timing controller 200 is logically divided into the above elements. The timing controller 200 may not be physically divided into the above elements.

The edge processing part 220 receives the input image data RGB1. The edge processing part 220 processes an edge portion of the object in the input image data RGB1 to generate compensated image data RGB2.

The edge processing part 220 outputs the compensated image data RGB2 to the image converting part 240.

Figure 3:
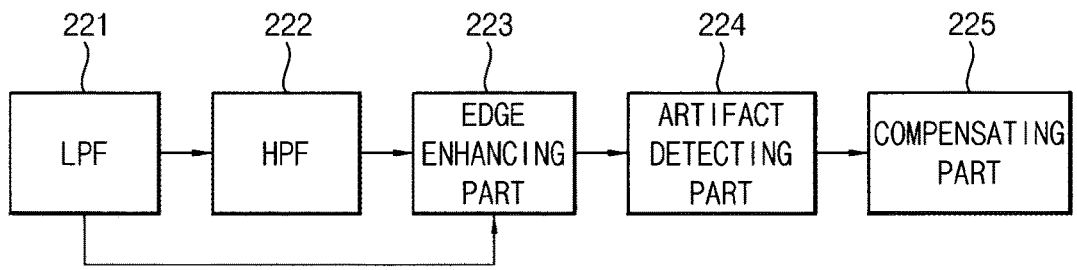
FIG. 3 is a block diagram illustrating an edge processing part of FIG. 2.
Figure 4:
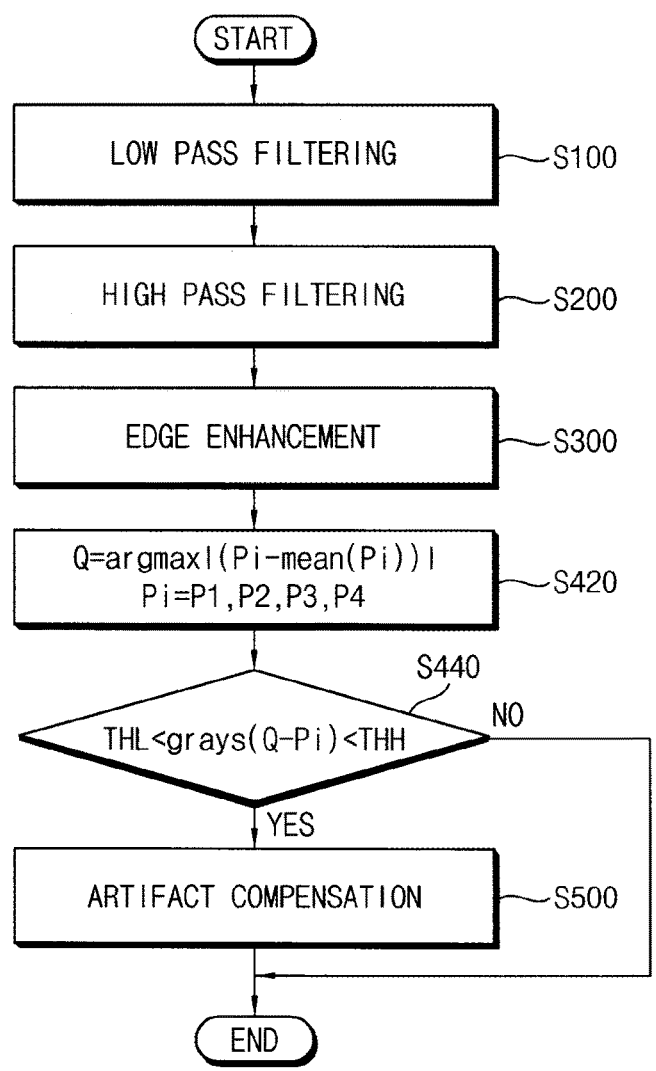
FIG. 4 is a flow chart illustrating a method of processing an image using the edge processing part of FIG. 2.

A structure of the edge processing part 220 is explained referring to FIGS. 3 and 4 in detail.

The image converting part 240 receives the compensated image data RGB2 from the edge processing part 220.

The image converting part 240 compensates grayscale data of the compensated image data RGB2 and rearranges the compensated image data RGB2 to generate the data signal DATA to correspond to a data type of the data driver 500. The data signal DATA may have a digital type. The image converting part 240 outputs the data signal DATA to the data driver 500.

For example, the image converting part 240 may include an adaptive color correcting part (not shown) and a dynamic capacitance compensating part (not shown).

The adaptive color correcting part receives the grayscale data, and operates an adaptive color correction ("ACC"). The adaptive color correcting part may compensate the grayscale data using a gamma curve.

The dynamic capacitance compensating part operates a dynamic capacitance compensation ("DCC"), which compensates the grayscale data of present frame data using previous frame data and the present frame data.

The signal generating part 260 receives the input control signal CONT. The signal generating part 260 generates the first control signal CONT1 to control a driving timing of the gate driver 300 based on the input control signal CONT. The signal generating part 260 generates the second control signal CONT2 to control a driving timing of the data driver 500 based on the input control signal CONT. The signal generating part 260 generates the third control signal CONT3 to control a driving timing of the gamma reference voltage generator 400 based on the input control signal CONT.

The signal generating part 260 outputs the first control signal CONT1 to the gate driver 300. The signal generating part 260 outputs the second control signal CONT2 to the data driver 500. The signal generating part 260 outputs the third control signal CONT3 to the gamma reference voltage generator 400.

FIG. 3 is a block diagram illustrating the edge processing part 220 of FIG. 2. FIG. 4 is a flow chart illustrating a method of processing an image using the edge processing part 220 of FIG. 2. FIGS. 5A to 5D are conceptual diagrams illustrating an operation of a compensating part 225 of FIG. 3. FIG. 6 is a conceptual diagram illustrating a compensating matrix used in the compensating part 225 of FIG. 3.

Referring to FIGS. 1 to 6, the edge processing part 220 includes a low pass filter 221, a high pass filter 222, an edge enhancing part 223, an artifact detecting part 224 and a compensating part 225.

The low pass filter 221 applies low pass filtering to the input image data RGB1 to remove noise of the input image data RGB1 (step S100). By the low pass filtering, a sharp slope of a change of grayscales may be reduced. Thus, the noise of the image of the input image data RGB1 may be removed.

However, by the low pass filtering, an edge portion of the object in the input image data RGB1 may become unclear.

The high pass filter 222 applies high pass filtering to the output of the low pass filter 221 to detect the edge portion of the object in the input image data RGB1 (step S200). By the high pass filtering, grayscale data corresponding to the edge portion of the object in the input image data RGB1 may be detected.

The edge enhancing part 223 emphasizes the edge portion of the object in the input image data RGB1 (step S300). The edge enhancing part 223 may add a result of the low pass filtering operated in the low pass filter 221 and a result of the high pass filtering operated in the high pass filter 222. The input image data RGB1 to which the low pass filtering is applied may have low noise but the unclear edge portion. When the result of the high pass filtering is added to the low pass filtered input image data RGB1, the edge portion of the object in the input image data RGB1 may be clearly emphasized.

However, a corner outlier artifact may be generated due to the edge emphasis of the edge enhancing part 223. The corner outlier artifact means that an edge portion of the object having a line shape, especially diagonal line shape, is shown as a stair shape due to the edge emphasis.

The artifact detecting part 224 detects the corner outlier artifact at an area adjacent to the edge portion of the object. For example, the artifact detecting part 224 may detect the corner outlier artifact for each pixel. For example, the artifact detecting part 224 may determine whether each pixel has the corner outlier artifact or not.

The artifact detecting part 224 may use a kernel having a two-by-two matrix shape. The artifact detecting part 224 may detect a pixel having the maximum grayscale difference among four pixels P1, P2, P3 and P4 which forms the two-by-two matrix shape.

For example, the artifact detecting part 224 may determine a Q pixel having a maximum absolute value of grayscale difference using a function of argmax|(Pi−mean(Pi))| (step S420). Herein, argmax means an argument of the maximum. A result of the function of argmax indicates x value when a function f(x) has the maximum value. Mean represents a function to obtain an average value. In addition, i may have one of 1, 2, 3 and 4. The Q pixel may represent a pixel having a maximum difference between a pixel grayscale and the average grayscale of first to fourth pixels. For example, when a grayscale of the first pixel P1 is 200, a grayscale of the second pixel P2 is 10, a grayscale of the third pixel P3 is 10 and a grayscale of the fourth pixel P4 is 20, mean(Pi) is 60 and argmax |(Pi−mean(Pi))| is the first pixel P1.

The artifact detecting part 224 may detect the corner outlier artifact using a difference between the grayscale of the Q pixel (e.g. the first pixel P1) and the grayscales of the other pixels (e.g. the second, third and fourth pixels P2, P3 and P4) (step S440).

For example, the artifact detecting part 224 determines that the Q pixel (e.g. the first pixel P1) has the corner outlier artifact when a difference between the grayscale of Q pixel (e.g. the first pixel P1) and the grayscales of the other pixels (e.g. the second, third and fourth pixels P2, P3 and P4) is greater than a low threshold value THL. The artifact detecting part 224 may determine that the Q pixel (e.g. the first pixel P1) has the corner outlier artifact when all of the differences (e.g. |P1−P2|, |P1−P3| and |P1−P4|) between the grayscale of Q pixel (e.g. the first pixel P1) and the grayscales of the other pixels (e.g. the second, third and fourth pixels P2, P3 and P4) are greater than a low threshold value THL.

When the Q pixel is brighter than the other pixels by the low threshold value THL, the Q pixel is determined as a compensation required pixel. When the Q pixel is brighter than the other pixels by the low threshold value THL, an edge portion of the object may have the corner outlier artifact due to the Q pixel.

For example, the artifact detecting part 224 may use a high threshold value THH as well as the low threshold value THL. For example, the artifact detecting part 224 determines that the Q pixel (e.g. the first pixel P1) has the corner outlier artifact when a difference between the grayscale of Q pixel (e.g. the first pixel P1) and the grayscales of the other pixels (e.g. the second, third and fourth pixels P2, P3 and P4) is greater than the low threshold value THL and less than the high threshold value THH. The artifact detecting part 224 may determine that the Q pixel (e.g. the first pixel P1) has the corner outlier artifact when all of the differences (e.g. P1-P2, P1-P3 and P1-P4) between the grayscale of Q pixel (e.g. the first pixel P1) and the grayscales of the other pixels (e.g. the second, third and fourth pixels P2, P3 and P4) are greater than a low threshold value THL and less than the high threshold value THH.

When the Q pixel is brighter than the other pixels by the low threshold value THL and is not over the high threshold value THH, the Q pixel is determined as a compensation required pixel. When the Q pixel is brighter than the other pixels by the high threshold value THH, a region including the Q pixel may represent a text. When the region representing the text is not required to be compensated.

When the high threshold value THH is properly set, a region representing the object and a region representing the text in the input image data RGB1 may be distinguished. Accordingly, the edge portion of the object may be compensated and the edge portion of the text may not be compensated.

In the present exemplary embodiment, the low threshold value THL and the high threshold value THH may have fixed values. For example, the low threshold value THL and the high threshold value THH may be set by a manufacturer.

The artifact detecting part 224 may sequentially apply a kernel having two rows and two columns to the whole input image data RGB1 to detect the corner outlier artifact.

The compensating part 225 compensates the corner outlier artifact (step S500). The compensating part 225 may determine a target pixel TP to be compensated.

The compensating part 225 may determine a pixel having the corner outlier artifact and a plurality of pixels adjacent to the pixel having the corner outlier artifact in a direction as the target pixels TP. For example, the target pixels TP may be disposed in a vertical direction.

Figure 5A:
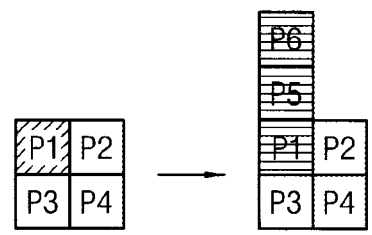
FIGS. 5A to 5D are conceptual diagrams illustrating an operation of a compensating part of FIG. 3.
Figure 6:
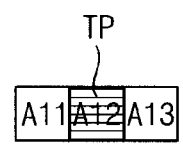
FIG. 6 is a conceptual diagram illustrating a compensating matrix used in the compensating part of FIG. 3.

In FIG. 5A, when a first pixel P1 in a first row and a first column has the corner outlier artifact among first to fourth pixels P1 to P4 in a two by two matrix, the compensating part 225 may determine the first pixel P1, a fifth pixel P5 adjacent to the first pixel P1 in an upper direction and a sixth pixel P6 adjacent to the fifth pixel P5 in the upper direction as the target pixels TP.

Figure 5B:
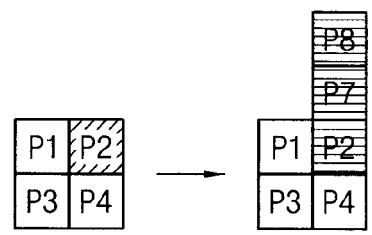

In FIG. 5B, when a second pixel P2 in a first row and a second column has the corner outlier artifact among first to fourth pixels P1 to P4 in a two by two matrix, the compensating part 225 may determine the second pixel P2, a seventh pixel P7 adjacent to the second pixel P2 in an upper direction and an eighth pixel P8 adjacent to the seventh pixel P7 in the upper direction as the target pixels TP.

Figure 5C:
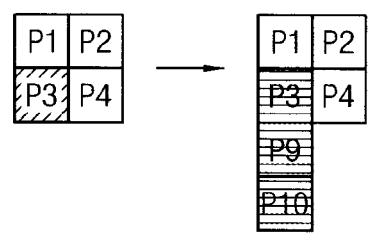

In FIG. 5C, when a third pixel P3 in a second row and a first column has the corner outlier artifact among first to fourth pixels P1 to P4 in a two by two matrix, the compensating part 225 may determine the third pixel P3, a ninth pixel P9 adjacent to the third pixel P3 in a lower direction and a tenth pixel P10 adjacent to the ninth pixel P9 in the lower direction as the target pixels TP.

Figure 5D:
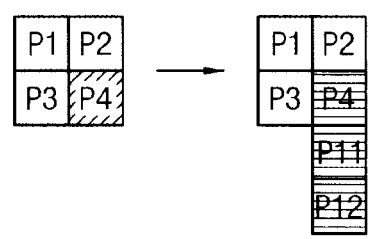

In FIG. 5D, when a fourth pixel P4 in a second row and a second column has the corner outlier artifact among first to fourth pixels P1 to P4 in a two by two matrix, the compensating part 225 may determine the fourth pixel P4, an eleventh pixel P11 adjacent to the fourth pixel P4 in a lower direction and a twelfth pixel P12 adjacent to the eleventh pixel P11 in the lower direction as the target pixels TP.

In the present exemplary embodiment, although the compensating part 225 determines the pixel having the corner outlier artifact and two pixels adjacent to the pixel having the corner outlier artifact (three pixels in total) as the target pixels TP, the present invention is not limited thereto. Alternatively, for example, the compensating part 225 may determine the pixel having the corner outlier artifact and four pixels adjacent to the pixel having the corner outlier artifact (five pixels in total) as the target pixels TP.

In addition, a length of target pixels TP in the display panel 100 may be varied according to a position of the pixel in the display panel 100.

Referring again to FIG. 6, the compensating part 225 respectively applies a compensating matrix A having one row and three columns to the target pixels TP to compensate the artifact. The compensating matrix A has values of (A11, A12, A13). The compensating matrix A may be applied to the target pixel TP and two pixels adjacent to the target pixel TP in a horizontal direction.

A compensating value of the target pixel TP may be a sum of a multiplication of A11 disposed in a first row and a first column of the compensating matrix A and a grayscale of a pixel disposed at a left side of the target pixel TP, a multiplication of A12 disposed in the first row and a second column of the compensating matrix A and a grayscale of the target pixel TP and a multiplication of A13 disposed in a first row and a third column of the compensating matrix A and a grayscale of a pixel disposed at a right side of the target pixel TP.

The compensating matrix A may be an averaging filter. For example, the compensating matrix A may have values of (1/3, 1/3, 1/3). Thus, the compensating value of the target pixel TP may be an average value of the grayscale of the target pixel TP and the grayscales of the pixels disposed at the left and right sides of the target pixel TP.

Alternatively, the compensating matrix A may be a Gaussian filter. For example, the compensating matrix A may have values of (1/4, 1/2, 1/4).

The compensating part 225 applies the compensating matrix A to the target pixel TP to compensate the grayscale of the target pixel TP. The grayscales of the target pixels TP come close to the grayscales of the pixels adjacent to the target pixels TP by the compensating matrix A. Accordingly, the edge portion of the target pixels TP is blurred so that the corner outlier artifact generated adjacent to the edge portion of the object may be decreased.

The edge processing part 220 may operate the image processing in a color space of YCbCr. For example, the edge processing part 220 may operate the image processing for Y component which represents a luminance among Y component, Cb component and Cr component.

Thus, the edge processing part 220 may further include a first color space converting part converting the input image data RGB1 having the RGB type into the YCbCr type and a second color space converting part the image data which are sequentially low pass filtered, high pass filtered, edge enhanced and artifact compensated in the YCbCr color space into the RGB type.

According to the present exemplary embodiment, the edge portion of the object in the image is enhanced and the corner outlier artifact adjacent to the edge portion of the object is decreased so that the display quality may be improved.

Figure 7:
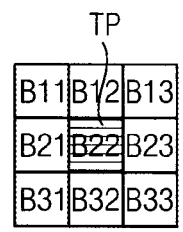
FIG. 7 is a conceptual diagram illustrating a compensating matrix used in a compensating part of a display apparatus according to an exemplary embodiment of the present invention.

FIG. 7 is a conceptual diagram illustrating a compensating matrix used in a compensating part of a display apparatus according to an exemplary embodiment of the present invention.

The display apparatus and a method of processing the image according to the present exemplary embodiment are substantially the same as the display apparatus and a method of processing the image of the previous exemplary embodiment explained referring to FIGS. 1 to 6 except for the compensating matrix employed to the compensating part of the edge processing part. Thus, the same reference numerals will be used to refer to the same or like parts as those described in the previous exemplary embodiment of FIGS. 1 to 6 and any repetitive explanation concerning the above elements will be omitted.

Referring to FIGS. 1 to 5 and 7, the display apparatus includes a display panel 100 and a panel driver. The panel driver includes a timing controller 200, a gate driver 300, a gamma reference voltage generator 400 and a data driver 500.

The timing controller 200 includes an edge processing part 220, an image converting part 240 and a signal generating part 260.

The edge processing part 220 includes a low pass filter 221, a high pass filter 222, an edge enhancing part 223, an artifact detecting part 224 and a compensating part 225.

The compensating part 225 compensates the corner outlier artifact. The compensating part 225 may determine a target pixel TP to be compensated.

The compensating part 225 may determine a pixel having the corner outlier artifact and a plurality of pixels adjacent to the pixel having the corner outlier artifact in a direction as the target pixels TP. For example, the target pixels TP may be disposed in a vertical direction.

The compensating part 225 respectively applies a compensating matrix B having three rows and three columns to the target pixels TP to compensate the artifact. The compensating matrix B has values of $$\begin{pmatrix} B11 & B12 & B13 \\ B21 & B22 & B23 \\ B31 & B32 & B33 \end{pmatrix}.$$

The compensating matrix B may be applied to the target pixel TP and eight pixels adjacent to the target pixel TP in horizontal, vertical and diagonal directions.

A compensating value of the target pixel TP may be a sum of a multiplication of B11 disposed in a first row and a first column of the compensating matrix B and a grayscale of a pixel disposed in a left and upper diagonal direction of the target pixel TP, a multiplication of B12 disposed in the first row and a second column of the compensating matrix B and a grayscale of a pixel disposed in an upper direction of the target pixel TP, a multiplication of B13 disposed in the first row and a third column of the compensating matrix B and a grayscale of a pixel disposed in a right and upper diagonal direction of the target pixel TP, a multiplication of B21 disposed in a second row and the first column of the compensating matrix B and a grayscale of a pixel disposed in a left direction of the target pixel TP, a multiplication of B22 disposed in the second row and the second column of the compensating matrix B and a grayscale of the target pixel TP, a multiplication of B23 disposed in the second row and the third column of the compensating matrix B and a grayscale of a pixel disposed in a right direction of the target pixel TP, a multiplication of B31 disposed in a third row and the first column of the compensating matrix B and a grayscale of a pixel disposed in a left and lower diagonal direction of the target pixel TP, a multiplication of B32 disposed in the third row and the second column of the compensating matrix B and a grayscale of a pixel disposed in a lower direction of the target pixel TP and a multiplication of B33 disposed in the third row and the third column of the compensating matrix B and a grayscale of a pixel disposed in a right and lower diagonal direction of the target pixel TP.

The compensating matrix B may be an averaging filter. For example, the compensating matrix B may have values of $$\begin{pmatrix} 1/9 & 1/9 & 1/9 \\ 1/9 & 1/9 & 1/9 \\ 1/9 & 1/9 & 1/9 \end{pmatrix}.$$

Thus, the compensating value of the target pixel TP may be an average value of the grayscale of the target pixel and the grayscales of eight pixels adjacent to the target pixel TP in horizontal, vertical and diagonal directions.

Alternatively, the compensating matrix B may be a Gaussian filter. For example, the compensating matrix B may have values of $$\begin{pmatrix} 1/16 & 1/16 & 1/16 \\ 1/16 & 1/2 & 1/16 \\ 1/16 & 1/16 & 1/16 \end{pmatrix}.$$

The compensating part 225 applies the compensating matrix B to the target pixel TP to compensate the grayscale of the target pixel TP. The grayscales of the target pixels TP come close to the grayscales of the pixels adjacent to the target pixels TP by the compensating matrix B. Accordingly, the edge portion of the target pixels TP is blurred so that the corner outlier artifact generated adjacent to the edge portion of the object may be decreased.

According to the present exemplary embodiment, the edge portion of the object in the image is enhanced and the corner outlier artifact adjacent to the edge portion of the object is decreased so that the display quality may be improved.

Figure 8:
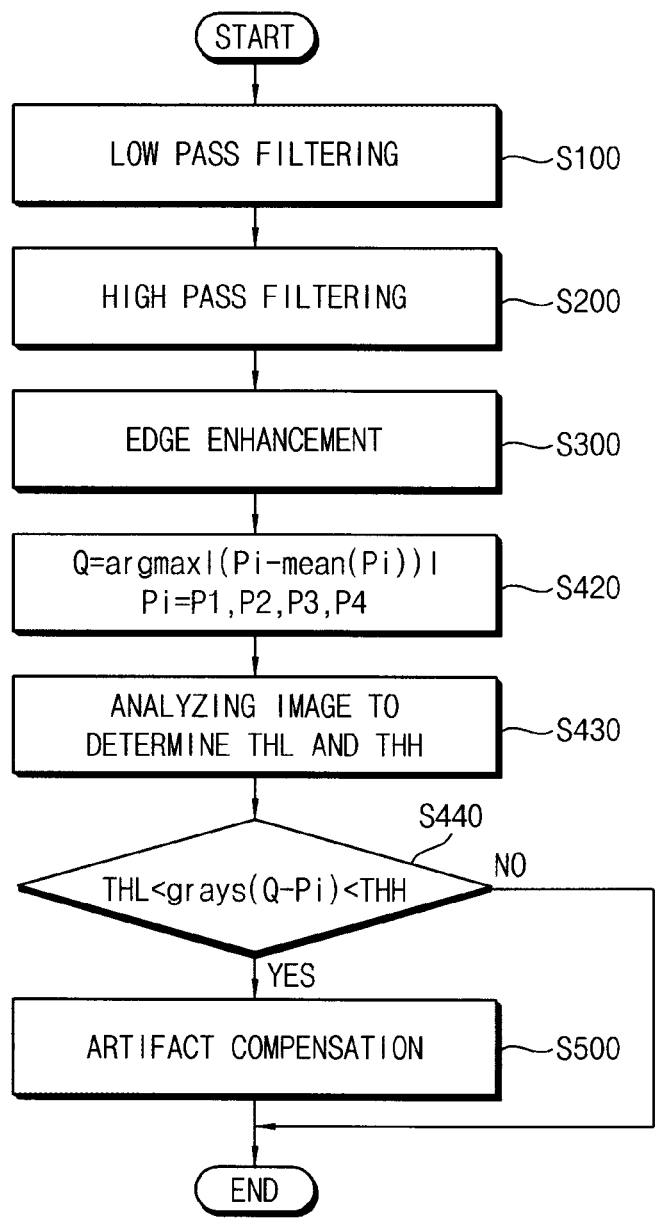
FIG. 8 is a flow chart illustrating a method of processing an image using an edge processing part according to an exemplary embodiment of the present invention.

FIG. 8 is a flow chart illustrating a method of processing an image using an edge processing part according to an exemplary embodiment of the present invention.

The display apparatus and a method of processing the image according to the present exemplary embodiment are substantially the same as the display apparatus and a method of processing the image of the previous exemplary embodiment explained referring to FIGS. 1 to 6 except for the operations of the edge processing part and the artifact detecting part. Thus, the same reference numerals will be used to refer to the same or like parts as those described in the previous exemplary embodiment of FIGS. 1 to 6 and any repetitive explanation concerning the above elements will be omitted.

Referring to FIGS. 1 to 5 and 8, the display apparatus includes a display panel 100 and a panel driver. The panel driver includes a timing controller 200, a gate driver 300, a gamma reference voltage generator 400 and a data driver 500.

The timing controller 200 includes an edge processing part 220, an image converting part 240 and a signal generating part 260.

The edge processing part 220 includes a low pass filter 221, a high pass filter 222, an edge enhancing part 223, an artifact detecting part 224 and a compensating part 225.

The low pass filter 221 applies low pass filtering to the input image data RGB1 to remove noise of the input image data RGB1 (step S100).

The high pass filter 222 applies high pass filtering to the output of the low pass filter 221 to detect the edge portion of the object in the input image data RGB1 (step S200).

The edge enhancing part 223 emphasizes the edge portion of the object in the input image data RGB1 (step S300).

The artifact detecting part 224 detects the corner outlier artifact at an area adjacent to the edge portion of the object. For example, the artifact detecting part 224 may detect the corner outlier artifact for each pixel. For example, the artifact detecting part 224 may determine whether each pixel has the corner outlier artifact or not.

The artifact detecting part 224 may use a kernel having a two-by-two matrix shape. The artifact detecting part 224 may detect a pixel having the maximum grayscale difference among four pixels P1, P2, P3 and P4 which forms the two-by-two matrix shape.

For example, the artifact detecting part 224 may determine a Q pixel using a function of argmax |(Pi−mean(Pi))| (step S420).

In the present exemplary embodiment, the artifact detecting part 224 analyzes the input image data RGB1 to determine the low threshold value THL and the high threshold value THH (step S430). Thus, the high threshold value THH and the low threshold value THL may be varied according to the input image data RGB1.

For example, when the frequency of occurrence of the corner outlier artifact is high in a display image of the input image data RGB1, the low threshold value THL may be relatively low.

For example, when the frequency of occurrence of the corner outlier artifact is low in the display image of the input image data RGB1, the low threshold value THL may be relatively high.

The artifact detecting part 224 may determine whether or not a text exists in the display image of the input image data RGB1 to determine the low threshold value THL and the high threshold value THH.

For example, when the text exists in the display image of the input image data RGB1, the high threshold value THH may be set based on a grayscale of a portion representing the text.

For example, when the display image of the input image data RGB1 is relatively bright, the low threshold value THL and the high threshold value THH may be relatively high.

For example, when the display image of the input image data RGB1 is relatively dark, the low threshold value THL and the high threshold value THH may be relatively low.

The artifact detecting part 224 may detect the corner outlier artifact using a difference between the grayscale of the Q pixel (e.g. the first pixel P1) and the grayscales of the other pixels (e.g. the second, third and fourth pixels P2, P3 and P4) (step S440).

For example, the artifact detecting part 224 determines that the Q pixel (e.g. the first pixel P1) has the corner outlier artifact when a difference between the grayscale of Q pixel (e.g. the first pixel P1) and the grayscales of the other pixels (e.g. the second, third and fourth pixels P2, P3 and P4) is greater than a low threshold value THL.

For example, the artifact detecting part 224 may use a high threshold value THH as well as the low threshold value THL. For example, the artifact detecting part 224 determines that the Q pixel (e.g. the first pixel P1) has the corner outlier artifact when a difference between the grayscale of Q pixel (e.g. the first pixel P1) and the grayscales of the other pixels (e.g. the second, third and fourth pixels P2, P3 and P4) is greater than the low threshold value THL and less than the high threshold value THH.

The compensating part 225 compensates the corner outlier artifact (step S500). The compensating part 225 may determine a target pixel TP to be compensated.

The compensating part 225 may determine a pixel having the corner outlier artifact and a plurality of pixels adjacent to the pixel having the corner outlier artifact in a direction as the target pixels TP. For example, the target pixels TP may be disposed in a vertical direction.

The compensating part 225 may compensate the target pixels TP using the matrix A having one row and three columns as shown in FIG. 6.

Alternatively, the compensating part 225 may compensate the target pixels TP using the matrix B having three rows and three columns as shown in FIG. 7.

According to the present exemplary embodiment, the edge portion of the object in the image is enhanced and the corner outlier artifact adjacent to the edge portion of the object is decreased so that the display quality may be improved.

According to the present invention as explained above, the edge portion of the object is enhanced and the corner outlier artifact is decreased so that the display quality may be improved.

The foregoing is illustrative of the present invention and is not to be construed as limiting thereof. Although a few exemplary embodiments of the present invention have been described, those skilled in the art will readily appreciate that many modifications are possible in the exemplary embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific exemplary embodiments disclosed, and that modifications to the disclosed exemplary embodiments, as well as other exemplary embodiments, are intended to be included within the scope of the appended claims. The present invention is defined by the following claims, with equivalents of the claims to be included therein.

What is claimed is:

1. An image processing part comprising:
  an edge enhancing part emphasizing an edge portion of an object in input image data;
  an artifact detecting part detecting a corner outlier artifact at an area adjacent to the edge portion of the object; and
  a compensating part compensating the corner outlier artifact,
  wherein the artifact detecting part detects a pixel having a maximum grayscale difference between a pixel gray scale and an average gray scale of pixels in a matrix shape among the pixels in the matrix shape, and determines that the pixel having the maximum grayscale difference has the corner outlier artifact when each of differences between a grayscale of the pixel having the maximum grayscale difference and grayscales of other pixels in the matrix shape is greater than a low threshold value.

2. The image processing part of claim 1, wherein the artifact detecting part determines that the pixel having the maximum grayscale difference has the corner outlier artifact when the each of differences between the grayscale of the pixel having the maximum grayscale difference and the grayscales of the other pixels in the matrix shape is greater than the low threshold value and less than a high threshold value.

3. The image processing part of claim 2, wherein the artifact detecting part analyzes the input image data to determine the low threshold value and the high threshold value according to the input image data.

4. An image processing part comprising:
  an edge enhancing part emphasizing an edge portion of an object in input image data;
  an artifact detecting part detecting a corner outlier artifact at an area adjacent to the edge portion of the object; and
  a compensating part compensating the corner outlier artifact
  wherein the compensating part determines target pixels to be compensated, the target pixels including a pixel having the corner outlier artifact and at least two pixels disposed on a same column as the pixel having the corner outlier artifact, and
  wherein the same column has one pixel width.

5. The image processing part of claim 4, wherein the compensating part applies a compensating matrix having one row and three columns to the target pixels to compensate the corner outlier artifact.

6. The image processing part of claim 5, wherein the compensating matrix has values of (1/3, 1/3, 1/3).

7. The image processing part of claim 5, wherein the compensating matrix has values of (1/4, 1/2, 1/4).

8. The image processing part of claim 4, wherein the compensating part applies a compensating matrix having three rows and three columns to the target pixels to compensate the corner outlier artifact.

9. The image processing part of claim 8, wherein the compensating matrix has values of $$\begin{pmatrix} 1/9 & 1/9 & 1/9 \\ 1/9 & 1/9 & 1/9 \\ 1/9 & 1/9 & 1/9 \end{pmatrix}.$$

10. The image processing part of claim 8, wherein the compensating matrix has values of $$\begin{pmatrix} 1/16 & 1/16 & 1/16 \\ 1/16 & 1/2 & 1/16 \\ 1/16 & 1/16 & 1/16 \end{pmatrix}.$$

11. The image processing part of claim 1, further comprising a low pass filter applying low pass filtering to the input image data to remove noise of the input image data and a high pass filter applying high pass filtering to the input image data to detect the edge portion of the object in the input image data, wherein the edge enhancing part adds a result of the low pass filtering and a result of the high pass filtering to emphasize the edge portion of the object.

12. A display apparatus comprising:

a display panel displaying an image;
a gate driver providing a gate signal to the display panel;
a data driver providing a data voltage to the display panel; and
a timing controller comprising an image processing part including an edge enhancing part emphasizing an edge portion of an object in input image data, an artifact detecting part detecting a corner outlier artifact at an area adjacent to the edge portion of the object and a compensating part compensating the corner outlier artifact, the timing controller controlling the gate driver and the data driver,
wherein the artifact detecting part detects a pixel having a maximum grayscale difference between a pixel grayscale and an average grayscale of pixels in a matrix shape among the pixels in the matrix shape, and
wherein the artifact detecting part determines that the pixel having the maximum grayscale difference has the corner outlier artifact when each of differences between a grayscale of the pixel having the maximum grayscale difference and grayscales of the other pixels in the matrix shape is greater than a low threshold value.

13. The display apparatus of claim 12, wherein the artifact detecting part determines that the pixel having the maximum grayscale difference has the corner outlier artifact when the each of differences between the grayscale of the pixel having the maximum grayscale difference and the grayscales of the other pixels in the matrix shape is greater than the low threshold value and less than a high threshold value.

14. The display apparatus of claim 12, wherein the compensating part determines target pixels to be compensated, the target pixels including a pixel having the corner outlier artifact and a plurality of pixels disposed on a same column as the pixel having the corner outlier artifact in a direction as target pixels to be compensated.

15. A method of processing an image, the method comprising:

emphasizing an edge portion of an object in input image data;
detecting a corner outlier artifact at an area adjacent to the edge portion of the object; and
compensating the corner outlier artifact,
wherein the detecting a corner outlier artifact comprises:
detecting a pixel having a maximum grayscale difference between a pixel grayscale and an average grayscale of pixels in a matrix shape among the pixels in the matrix shape; and
determining that the pixel having the maximum grayscale difference has the corner outlier artifact when each of differences between a grayscale of the pixel having the maximum grayscale difference and grayscales of the other pixels in the matrix shape is greater than a low threshold value.

16. The method of claim 15, wherein the determining that the pixel having the maximum grayscale difference has the corner outlier artifact further comprises:

determining that the each of differences between the grayscale of the pixel having the maximum grayscale difference and the grayscales of the other pixels in the matrix shape is less than a high threshold value.

17. The method of claim 15, wherein the compensating the corner outlier artifact comprises:

determining target pixels to be compensated, the target pixels including a pixel having the corner outlier artifact and a plurality of pixels disposed on a same column as the pixel having the corner outlier artifact in a direction as target pixels to be compensated.

* * * * *